United States Patent
Zimmerman et al.

(10) Patent No.: US 11,342,559 B2
(45) Date of Patent: *May 24, 2022

(54) BATTERY WITH POLYVALENT METAL ANODE

(71) Applicant: IONIC MATERIALS, INC., Woburn, MA (US)

(72) Inventors: Michael A. Zimmerman, North Andover, MA (US); Alexei B. Gavrilov, Woburn, MA (US)

(73) Assignee: IONIC MATERIALS, INC., Woburn, MA (US)

(*) Notice: Subject to any disclaimer, the term of this patent is extended or adjusted under 35 U.S.C. 154(b) by 399 days.

This patent is subject to a terminal disclaimer.

(21) Appl. No.: 15/580,971

(22) PCT Filed: Jun. 8, 2016

(86) PCT No.: PCT/US2016/036403
§ 371 (c)(1),
(2) Date: Dec. 8, 2017

(87) PCT Pub. No.: WO2016/200907
PCT Pub. Date: Dec. 15, 2016

(65) Prior Publication Data

US 2018/0198124 A1    Jul. 12, 2018
US 2020/0303740 A9   Sep. 24, 2020

Related U.S. Application Data

(63) Continuation-in-part of application No. 15/605,425, filed on May 25, 2017, now Pat. No. 10,559,827, and
(Continued)

(51) Int. Cl.
*H01M 10/054* (2010.01)
*H01M 4/60* (2006.01)
(Continued)

(52) U.S. Cl.
CPC .......... *H01M 4/602* (2013.01); *H01M 4/131* (2013.01); *H01M 4/134* (2013.01); *H01M 4/136* (2013.01);
(Continued)

(58) Field of Classification Search
None
See application file for complete search history.

(56) References Cited

U.S. PATENT DOCUMENTS

| | | | |
|---|---|---|---|
| 2,638,489 A | 5/1953 | Ruben | |
| 3,257,241 A | 6/1966 | Tamminen | |

(Continued)

FOREIGN PATENT DOCUMENTS

| | | | |
|---|---|---|---|
| CN | 1242877 A | 1/2000 | |
| CN | 1285086 A | 2/2001 | |

(Continued)

OTHER PUBLICATIONS

Wu, et al., Journal of Membrane Science, 2006, 280, 802-808 (Year: 2006).*

(Continued)

*Primary Examiner* — Wyatt P McConnell
(74) *Attorney, Agent, or Firm* — Burns & Levinson, LLP; Joseph M. Maraia (57) ABSTRACT

A battery having a polyvalent metal as the electrochemically active material in the anode which also includes a solid ionically conductive polymer material.

34 Claims, 1 Drawing Sheet

Related U.S. Application Data a continuation-in-part of application No. 15/672,878, filed on Aug. 9, 2017, now Pat. No. 10,811,688, and a continuation-in-part of application No. 15/148,085, filed on May 6, 2016, and a continuation-in-part of application No. 15/282,002, filed on Sep. 30, 2016.

(60) Provisional application No. 62/172,467, filed on Jun. 8, 2015.

(51) Int. Cl.

| | | |
|---|---|---|
| *H01M 10/0565* | (2010.01) | |
| *H01M 4/46* | (2006.01) | |
| *H01M 10/24* | (2006.01) | |
| *H01M 4/62* | (2006.01) | |
| *H01M 4/131* | (2010.01) | |
| *H01M 4/38* | (2006.01) | |
| *H01M 4/50* | (2010.01) | |
| *H01M 4/134* | (2010.01) | |
| *H01M 4/136* | (2010.01) | |
| *H01M 4/1395* | (2010.01) | |
| *H01M 4/1399* | (2010.01) | |
| *H01M 10/0562* | (2010.01) | |
| *H01M 4/02* | (2006.01) | |

(52) U.S. Cl.
CPC ....... *H01M 4/1395* (2013.01); *H01M 4/1399* (2013.01); *H01M 4/381* (2013.01); *H01M 4/463* (2013.01); *H01M 4/466* (2013.01); *H01M 4/50* (2013.01); *H01M 4/624* (2013.01); *H01M 10/054* (2013.01); *H01M 10/0562* (2013.01); *H01M 10/0565* (2013.01); *H01M 10/24* (2013.01); *H01M 2004/027* (2013.01); *H01M 2004/028* (2013.01); *H01M 2300/0082* (2013.01)

(56) References Cited

U.S. PATENT DOCUMENTS

| | | |
|---|---|---|
| 3,336,279 A | 8/1967 | Scott |
| 3,502,606 A | 3/1970 | Conciatori et al. |
| 4,243,732 A | 1/1981 | Powers et al. |
| 4,465,744 A | 8/1984 | Susman et al. |
| 4,471,037 A | 9/1984 | Bannister |
| 4,556,165 A | 12/1985 | Yamawacki et al. |
| 4,654,279 A | 3/1987 | Bauer et al. |
| 4,720,910 A * | 1/1988 | Rourke .................. H01M 4/04 29/623.5 |
| 4,804,594 A | 2/1989 | Jow et al. |
| 4,925,751 A * | 5/1990 | Shackle .................. H01M 4/02 429/314 |
| 5,147,739 A | 9/1992 | Beard |
| 5,160,880 A | 11/1992 | Palanisamy |
| 5,169,494 A | 12/1992 | Hashimoto et al. |
| 5,227,043 A | 7/1993 | Shakushiro et al. |
| 5,270,137 A | 12/1993 | Kubota |
| 5,378,560 A | 1/1995 | Tomiyama |
| 5,403,675 A | 4/1995 | Ogata et al. |
| 5,424,151 A | 6/1995 | Koksbang et al. |
| 5,462,566 A | 10/1995 | Skotheim |
| 5,506,073 A | 4/1996 | Angell et al. |
| 5,518,841 A * | 5/1996 | Sotomura .................. H01M 4/36 252/182.1 |
| 5,569,559 A | 10/1996 | Fauvarque |
| 5,582,937 A | 12/1996 | LaFollette |
| 5,599,355 A | 2/1997 | Nagasubramanian et al. |
| 5,620,811 A | 4/1997 | Zhang et al. |
| 5,648,187 A | 7/1997 | Skotheim |
| 5,660,953 A | 8/1997 | Bai et al. |
| 5,688,613 A | 11/1997 | Li et al. |
| 5,713,169 A | 2/1998 | Meier et al. |
| 5,882,621 A | 3/1999 | Doddapaneni et al. |
| 5,888,672 A | 3/1999 | Gustafson et al. |
| 5,917,693 A | 6/1999 | Kono et al. |
| 5,989,742 A | 11/1999 | Cabasso et al. |
| 6,074,773 A | 6/2000 | Wilkinson et al. |
| 6,110,619 A | 8/2000 | Zhang et al. |
| 6,162,563 A | 12/2000 | Miura et al. |
| 6,183,914 B1 | 2/2001 | Yao et al. |
| 6,248,474 B1 | 6/2001 | Nishiyama et al. |
| 6,274,261 B1 | 8/2001 | Tinker et al. |
| 6,274,681 B1 | 8/2001 | Inagaki et al. |
| 6,358,651 B1 | 3/2002 | Chen et al. |
| 6,376,123 B1 | 4/2002 | Chu |
| 6,413,676 B1 | 7/2002 | Munshi |
| 6,451,487 B1 | 9/2002 | Besner et al. |
| 6,455,202 B1 | 9/2002 | Marugan et al. |
| 6,461,724 B1 | 10/2002 | Radovanovic et al. |
| 6,630,271 B1 | 10/2003 | Arcella et al. |
| 6,645,675 B1 | 11/2003 | Munshi |
| 6,652,440 B1 | 11/2003 | Kovalev et al. |
| 6,664,006 B1 | 12/2003 | Munshi |
| 6,727,343 B2 | 4/2004 | Morris et al. |
| 7,070,882 B1 | 7/2006 | Ferrando |
| 7,455,935 B2 | 11/2008 | Abe et al. |
| 7,651,647 B1 | 1/2010 | Strange et al. |
| 8,227,105 B1 | 7/2012 | Gerald, II et al. |
| 8,753,594 B1 | 6/2014 | Burba, III et al. |
| 8,877,376 B2 | 11/2014 | Wakizaka et al. |
| 8,906,556 B2 | 12/2014 | Hambitzer |
| 8,945,432 B2 | 2/2015 | Towns |
| 9,742,008 B2 | 8/2017 | Zimmerman et al. |
| 9,819,053 B1 | 11/2017 | Zimmerman |
| 10,553,901 B2 | 2/2020 | Zimmerman et al. |
| 10,741,877 B1 | 8/2020 | Zimmerman |
| 10,811,688 B2 | 10/2020 | Zimmerman et al. |
| 11,114,655 B2 | 9/2021 | Zimmerman et al. |
| 11,145,857 B2 | 10/2021 | Zimmerman et al. |
| 11,145,899 B2 | 10/2021 | Zimmerman et al. |
| 11,152,657 B2 | 10/2021 | Zimmerman et al. |
| 2001/0003863 A1 | 6/2001 | Thibault et al. |
| 2002/0010261 A1 | 1/2002 | Callahan et al. |
| 2002/0048706 A1 | 4/2002 | Mayes et al. |
| 2002/0177043 A1 | 11/2002 | Ndzebet et al. |
| 2003/0013012 A1 | 1/2003 | Ahn et al. |
| 2003/0069343 A1 | 4/2003 | Smith et al. |
| 2003/0138702 A1 | 7/2003 | Gerald, II et al. |
| 2003/0162087 A1 | 8/2003 | Clarke et al. |
| 2003/0209692 A1 | 11/2003 | Farrand et al. |
| 2004/0023116 A1 | 2/2004 | Fujino et al. |
| 2004/0076881 A1 | 4/2004 | Bowden et al. |
| 2004/0157101 A1 | 8/2004 | Smedley |
| 2004/0229118 A1* | 11/2004 | Wensley ............ H01M 2/0207 429/162 |
| 2004/0241553 A1 | 12/2004 | Abe et al. |
| 2005/0019661 A1 | 1/2005 | Han et al. |
| 2005/0112458 A1 | 5/2005 | Dopp et al. |
| 2005/0112471 A1 | 5/2005 | Chen et al. |
| 2005/0164085 A1 | 7/2005 | Bofinger et al. |
| 2005/0181280 A1 | 8/2005 | Ceder et al. |
| 2005/0244696 A1 | 11/2005 | Kuromatsu et al. |
| 2005/0287441 A1 | 12/2005 | Passerini et al. |
| 2006/0004112 A1 | 1/2006 | Shimoyama et al. |
| 2006/0166085 A1 | 7/2006 | Hennige et al. |
| 2006/0269834 A1 | 11/2006 | West et al. |
| 2007/0015047 A1 | 1/2007 | Hosaka et al. |
| 2007/0020525 A1 | 1/2007 | Kim et al. |
| 2007/0051366 A1 | 3/2007 | Hansmann et al. |
| 2007/0166618 A1 | 7/2007 | Armand et al. |
| 2007/0250036 A1 | 10/2007 | Volk et al. |
| 2007/0287069 A1 | 12/2007 | Fukui |
| 2008/0066297 A1 | 3/2008 | Lin et al. |
| 2008/0090133 A1 | 4/2008 | Vu et al. |
| 2008/0118826 A1 | 5/2008 | Shimamura et al. |
| 2008/0199755 A1 | 8/2008 | Brotherston et al. |
| 2008/0248356 A1 | 10/2008 | Kimura et al. |
| 2008/0292953 A1 | 11/2008 | Hosaka et al. |
| 2008/0300380 A1 | 12/2008 | Bai et al. |
| 2009/0162755 A1 | 6/2009 | Neudecker |
| 2009/0197183 A1 | 8/2009 | Kato |

(56) References Cited

U.S. PATENT DOCUMENTS

| | | |
|---|---|---|
| 2009/0246636 A1 | 10/2009 | Chiang et al. |
| 2009/0272731 A1 | 11/2009 | Olding et al. |
| 2010/0227224 A1 | 9/2010 | Eitouni et al. |
| 2011/0020708 A1 | 1/2011 | Fujiki et al. |
| 2011/0027666 A1 | 2/2011 | Burchardt et al. |
| 2011/0070487 A1 | 3/2011 | Padhi et al. |
| 2011/0104511 A1 | 5/2011 | Okumura et al. |
| 2011/0104571 A1 | 5/2011 | Zhamu et al. |
| 2011/0111287 A1 | 5/2011 | Sayre et al. |
| 2011/0204341 A1 | 8/2011 | Brown et al. |
| 2011/0223477 A1 | 9/2011 | Nelson et al. |
| 2011/0223518 A1 | 9/2011 | Hirakimoto |
| 2011/0274983 A1 | 11/2011 | Yontz et al. |
| 2011/0274990 A1 | 11/2011 | Xu |
| 2011/0281158 A1 | 11/2011 | Tazoe |
| 2011/0281159 A1 | 11/2011 | Farmer et al. |
| 2011/0318646 A1 | 12/2011 | Babinec et al. |
| 2012/0094250 A1 | 4/2012 | Lloyd et al. |
| 2012/0107690 A1 | 5/2012 | Wakizaka et al. |
| 2012/0115049 A1 | 5/2012 | Rinzler et al. |
| 2012/0129045 A1 | 5/2012 | Gin et al. |
| 2012/0164526 A1 | 6/2012 | Adamson et al. |
| 2012/0171574 A1 | 7/2012 | Zhamu et al. |
| 2012/0189897 A1 | 7/2012 | Wakizaka et al. |
| 2012/0208091 A1 | 8/2012 | Tsai et al. |
| 2012/0231355 A1 | 9/2012 | Lee et al. |
| 2012/0321970 A1 | 12/2012 | Friesen et al. |
| 2013/0084507 A1 | 4/2013 | Johnson |
| 2013/0136981 A1 | 5/2013 | Peuchert et al. |
| 2013/0149436 A1 | 6/2013 | Hsieh et al. |
| 2013/0189589 A1 | 7/2013 | Hashaikeh et al. |
| 2013/0216936 A1 | 8/2013 | Fuchs et al. |
| 2013/0224632 A1* | 8/2013 | Roumi .............. H01M 2/166 429/516 |
| 2014/0004431 A1 | 1/2014 | Yamaguchi et al. |
| 2014/0057153 A1 | 2/2014 | Visco et al. |
| 2014/0059820 A1 | 3/2014 | Wright et al. |
| 2014/0079995 A1 | 3/2014 | Wakada |
| 2014/0088207 A1 | 3/2014 | Elabd et al. |
| 2014/0141336 A1 | 5/2014 | Morin |
| 2014/0227614 A1 | 8/2014 | Lee et al. |
| 2014/0349160 A1 | 11/2014 | Kato et al. |
| 2014/0377621 A1 | 12/2014 | Hanyu et al. |
| 2015/0064574 A1 | 3/2015 | He et al. |
| 2015/0064575 A1 | 3/2015 | He et al. |
| 2015/0146452 A1 | 5/2015 | Kim et al. |
| 2015/0155559 A1 | 6/2015 | Zimmerman et al. |
| 2015/0180037 A1 | 6/2015 | Gronwald et al. |
| 2015/0280218 A1 | 10/2015 | Zimmerman et al. |
| 2015/0364791 A1 | 12/2015 | Vu et al. |
| 2016/0028133 A1 | 1/2016 | Miles |
| 2016/0118685 A1 | 4/2016 | Zhang et al. |
| 2016/0233461 A1 | 8/2016 | Young et al. |
| 2016/0233510 A1 | 8/2016 | Onodera |
| 2016/0254514 A1* | 9/2016 | Roumi .............. H01M 2/166 429/403 |
| 2016/0365553 A1 | 12/2016 | Kountz et al. |
| 2017/0005356 A1 | 1/2017 | Zimmerman |
| 2017/0018781 A1 | 1/2017 | Zimmerman |
| 2017/0092958 A1 | 3/2017 | Zimmerman et al. |
| 2017/0338492 A1 | 11/2017 | Zimmerman et al. |
| 2018/0006308 A1 | 1/2018 | Zimmerman et al. |
| 2018/0151910 A1 | 5/2018 | Zimmerman et al. |
| 2018/0151914 A1 | 5/2018 | Zimmerman et al. |
| 2018/0175372 A1 | 6/2018 | Zimmerman et al. |
| 2018/0212232 A1 | 7/2018 | Zimmerman et al. |
| 2018/0219210 A1 | 8/2018 | Kim |
| 2018/0241031 A1 | 8/2018 | Pan et al. |
| 2019/0067764 A1 | 2/2019 | Zimmerman et al. |

FOREIGN PATENT DOCUMENTS

| | | |
|---|---|---|
| CN | 1326596 C | 12/2001 |
| CN | 1354529 C | 6/2002 |
| CN | 1372705 A | 10/2002 |
| CN | 1457518 C | 11/2003 |
| CN | 1592937 A | 3/2005 |
| CN | 1788375 A | 6/2006 |
| CN | 1965436 A | 5/2007 |
| CN | 101290985 A | 10/2008 |
| CN | 101542790 A | 9/2009 |
| EP | 0 145 498 A2 | 6/1985 |
| JP | 59-157151 A | 9/1984 |
| JP | 04-267055 A | 9/1992 |
| JP | 9-219197 A | 8/1997 |
| JP | 2002538585 T | 11/2002 |
| JP | 2002/352799 A | 12/2002 |
| JP | 2002/358959 A | 12/2002 |
| JP | 2003/242964 A | 8/2003 |
| JP | 2004-265675 A | 9/2004 |
| JP | 2005/535076 A | 11/2005 |
| JP | 2005535076 T | 11/2005 |
| JP | 2006/049122 A | 2/2006 |
| JP | 2006-210089 A | 8/2006 |
| JP | 2006520519 A | 9/2006 |
| JP | 2007-080642 | 3/2007 |
| JP | 2010/509719 A | 3/2010 |
| JP | 2011-28976 A | 2/2011 |
| JP | 2012/517519 B2 | 8/2012 |
| JP | 2012522336 T | 9/2012 |
| JP | 2014-067638 A | 4/2014 |
| JP | 2014-112560 A | 6/2014 |
| JP | 2015005493 A | 8/2015 |
| KR | 1020080023294 | 8/2003 |
| KR | 10-2008-0023294 A | 3/2008 |
| KR | 10-2011-0106342 A | 9/2011 |
| KR | 10-2012-0117853 A | 10/2012 |
| WO | 99/33127 | 7/1990 |
| WO | 1998/42037 A1 | 9/1998 |
| WO | 2001/17051 A1 | 3/2001 |
| WO | 2001/026175 A1 | 4/2001 |
| WO | 2004/027909 A1 | 4/2004 |
| WO | 2006/019064 A2 | 2/2006 |
| WO | 2011/146670 A1 | 11/2011 |
| WO | 2014/020349 A1 | 2/2014 |
| WO | 2015/084940 A1 | 6/2015 |
| WO | 2015/153729 A1 | 10/2015 |
| WO | 2016/196873 A1 | 12/2016 |
| WO | 2016/197098 A1 | 12/2016 |
| WO | 2019/065066 A1 | 4/2019 |

OTHER PUBLICATIONS

Ahmad et al., Structural studies and ionic conductivity of lithium iodide-lithium tungstate solid electrolytes. Ionics, 2002, 8, 433-438 (2002).

Celazole® T-Series: Injection Molding Thermoplastic Polymers. Brochure of PBI Performance Products, Inc., 2013.

Gal'Perin et al., Determination of the crystallinity of polyvinylidene fluoride. Polymer Science: USSR 1970, 12, 2133-2139 (1970).

Lee et al., PVDF-based nanocomposite solid polymer electrolytes; the effect of affinity between PVDF and filler on ionic conductivity. Composite Interfaces 2009, 16, 347-358.

Lithium Iodide Information. ChemBook. http://www.chemicalbook.com/ChemicalProductProperty_EN_cb8688141.htm. As viewed on Apr. 25, 2017.

PBI Information. Polymers: A Property Database 2017, CRC Press, Taylor & Francis Group (2017).

Polyacrylonitrile Information. ChemicalBook. http://www.chemicalbook.com/ChemicalProductProperty_USCB9199592.aspx. As viewed on Jan. 18, 2018.

Polymer Density Table. ScientificPolymer. http://scientificpolymer.com/density-of-polymers-by-density/. As viewed on Mar. 11, 2015.

Polyvinylidenefluoride (PVDF) Information, Goodfellow, http://www.goodfellow.eom/E/Polyvinylidenefluoride.html. As viewed on Jan. 18, 2018.

Spry, R.J. et al., Anisotropic Ionic Conductivity of Lithium-Doped Sulfonated PBI, Journal of Polymer Science: Part B: Polymer Physics, 35, 2925-2933 (1997).

(56) References Cited

OTHER PUBLICATIONS

Suib, S.L., New and future developments in catalysis: Batteries, Hydrogen Storage and Fuel Cells. Elsevier B.V. Jul. 29, 2013, pp. 1-16.
Extended European Search Report, dated Oct. 9, 2018, from related European Application No. EP 16804233, filed on Jan. 2, 2018.
International Search Report and the Written Opinion of the International Search Authority, dated Apr. 5, 2017, from related PCT/US2014/068338, filed on Dec. 3, 2014.
International Search Report and the Written Opinion of the International Search Authority, dated Oct. 26, 2016, from related PCT/US2016/035040, filed on May 31, 2016.
Candlin, J. "Polymers" within "The Chemical Industry: Second Edition." Edited by Alan Heaton. 1994. Spring Science+Business Media Dordrecht, pp. 116-121.
Dang, T.D. et al., "Ionic Conductivity of Conjugated Water-Soluble Rigid-Rod Polymers," Journal of Polymer Science: Part B: Polymer Physics, vol. 31 pp. 1941-1950, 1993.
Definition of Dopant. http://www.merriam-webster.com/dictionary/dopant. Downloaded Feb. 4, 2019.
Definition of Nonflammable. http://www.dictionary.com/browse/nonflammable?s=t. As viewed on Jun. 7, 2016.
Edman, L. et al., "Transport properties of the Solid Polymer Electrolyte System P(EO)nLiTFSI," Journal of Physical Chemistry B, 2000; vol. 104, No. 15, pp. 3476-3480.
Ferrando, W.A., "Development of a Novel Composite Aluminum Anode," Journal of Power Sources, vol. 130, Issues 102, pp. 309-314, May 2004. Abstract only.
Florjanczyk, Z. et al., "Polymer-in-Salt Electrolytes Based on Acrylonitrile/Butyl Acrylate Copolymers and Lithium Salts," Journal of Physical Chemistry B, 2004, vol. 108, pp. 14907-14914.
Kösters, J. et al., "Ion Transport Effects in a Solid Polymer Electrolyte Due to Salt Substitution and Addition Using an Ionic Liquid," Journal of Physical Chemistry B, 2013, vol. 117, pp. 2527-2534.
Lefrou, C. et al., "Electrochemistry: The Basics, With Examples." Springer-Verlag Berlin Heidelberg, pp. 22-25, 2012.
Lesch, V. et al., "A Combined theoretical and experimental study of the Influence of Different anion ratios on lithium ion dynamics in ionic liquids," Journal of Physical Chemistry B, 2014, vol. 118, No. 26, pp. 7367-7375.
Liew, C.-W. et al., "Characterization of ionic liquid added poly(vinyl alcohol)-based proton conducting polymer electrolytes and electrochemical studies on the supercapacitors," International Journal of Hydrogen Energy, vol. 40, pp. 852-862, 2015.
Miyatake, K. et al., "Synthesis of poly(phenylene sulfide sulfonic acid) via poly(sulfoniumcation) as a thermostable proton-conducting polymer," Macromolecules, vol. 29, pp. 6969-6971, 1996.
OPI Online Courses, "Insulator, Semiconductor Conductor," (online), Jul. 1, 2012.
Polyphenylene Sulfide Information. DIC Corporation, http://www.dic-global.com/us/en/products/pps/about.html. Downloaded on Jun. 8, 2016.
Polystyrene, Wikipedia. https://en.wikipedia.org/wiki/Polystyrene. Downloaded Feb. 4, 2019.
Sandor, R.B., "PBI (Polybenzimidazole): Synthesis, Properties and Applications," High Performance Polymers, vol. 2, No. 1, pp. 25-37, 1990.
Sannigrahi, A. et al., "Tuning the Molecular Properties of Polybenzimidazole by Copolymerization," Journal of Physical Chemistry B, vol. 111, pp. 12124-12132, 2007.
Santhosh, P. et al., "Preparation and properties of new cross-linked polyurethane acrylate electrolytes for lithium batteries," Journal of Power Sources 160, pp. 609-620, 2006.
Teng, H., "Overview of the development of the fluoropolymer Industry," Applied Sciences, 2012, vol. 2, pp. 496-512.
Wikipedia entry of Electrolyte. https://en.wikipedia.org/wiki/Electrolyte. Downloaded Feb. 1, 2019.
Yang, Y. et al., "Effect of Lithium Iodide Addition on Poly(ethylene oxide)-Poly(vinylidene fluoride) Polymer-Blend Electrolyte for dye-Sensitized Nanocrystalline Solar Cell," Journal of Physical Chemistry B, vol. 112, pp. 6594-6602, 2008.
Translated Text of the First Office Action, dated Aug. 7, 2018, from related Chinese Patent Application No. 2015/80018411.6.
Supplementary European Search Report, dated Apr. 5, 2017, from related European U.S. Appl. No. 14/868,257, filed Dec. 3, 2014.
Extended European Search Report, dated Oct. 8, 2018, from related European Patent Application No. 16804487.3, filed on Jan. 4, 2018.
Extended European Search Report, dated Oct. 5, 2018, from related European Patent Application No. 16804636.5, filed on Jan. 4, 2018.
Extended European Search Report, dated Dec. 13, 2018, from related European Patent Application No. 16808115.6, filed on Jun. 7, 2016.
International Search Report and the Written Opinion of the International Searching Authority, dated Apr. 5, 2018 from related PCT/US2018/015146 filed on Jan. 25, 2018.
Written Opinion of the Singapore Intellectual Property Office, dated Jul. 31, 2018, from related Singapore Patent Application No. SG2018/4525517527Y.
Supplementary European Search Report dated Oct. 15, 2018, from counterpart European National Phase Application No. EP 16808165.1, filed Jun. 8, 2016.
Sigma Aldritch Materials Science Products. Pi-conjugated Polymers. Jun. 5, 2014 (Jun. 5, 2014) [retrieved on Aug. 9, 2016]. Retrieved from the Internet: <URL: http://www.sigmaaldrich.com/materials-science/material-science-products.html? TablePage=111775702>. entire document.
Barron et al. The Effect of Temperature on Conductivity Measurement. TSP, vol. 3. 2007. [retrieved on Aug. 9, 2016]. Retrieved from the Internet: <URL:http://www.reagecon.com/pdf/technicalpapers/Effect_of_Temperature_TSP-07_Issue3.pdf>. entire document.
Tokito et al. Electrical Conductivity and Optical Properties of Poly(p- phenylene sulfide) doped with Some Organic Acceptors. Polymer Journal, vol. 17, No. 8, pp. 959-968.1985. Retrieved from the Internet<URL:HTTP:// www.nature.com/pj/journal/v17/n8/pdf/pj 1985103a.pdf > entire document.
Solvay. Ryton PPS. Feb. 7, 2015 (Feb. 7, 2015) [retrieved on Aug. 9, 2016]. Retrieved from the Internet: <URL:http://www.solvay.com/en/markets-and-products/featured-products/Ryton-PPS.htmlf>. entire document.
Diez-Pascual, A., et al. "High-Performance Aminated Poly(phenylene sulfide)/ZnO Nanocomposites for Medical Applications." ACS Applied Materials & Interfaces 6, No. 13 (Jun. 13, 2014), 10132-10145.
Wu, Y., ed., "Chapter 11: Solid Electrolyte." In Lithium Ion Battery Application and Practice, Chemical Industry Press, China: Chemical Industry Press, 2011. Cited in Third Office Action for CN 2015/80018411.6. Art is summarized in the attached foreign Office Action citing the art, and a translation of the summary with a copy of the translator signature is attached.
Brady, D.G. "The crystallinity of poly(phenylene sulfide) and its effect on polymer properties." Journal of Applied Polymer Science, 1976, 20, 2541-2551.
Diez-Pascual, A.M. et al., "Inorganic nanoparticle-modified poly(phenylene sulphide)/carbon fiber laminates: thermomechanical behaviours." Materials, 2013, 6, 3171-3193.
Lefkowiiz et al., "Influence of pH on the Reductive Transformation of Birnessite by Aqueous Mn(II)," Environmental Science & Technology, vol. 47, pp. 10364-10371, 2013.
Lu, Cuihong and Pan, Chunyue, "A Reviewon Factors Influencing Ionic Conductivity of Polymer Electrolyte," Materials Reports, pp. 58-60, 38, Apr. 17, 2003. Chinese with English translation.
Nohara, L.B. et al., "Study of crystallization behavior of poly(phenylene sulfide)." Polimeros: Ciencia e tecnologia, 2006, 16, 104-110.
Persson et al., "Materials Data on MnO2 (SG:164) by Materials Project," database entry #mp-25558, Nov. 2014 [retrieved via <https://doi.org/10.17188/1200755>].
Wang et al., "The effects of Mn loading on the structure and ozone decomposition activity of MnOx supported on activated carbon," Chinese Journal of Catalysis, vol. 35, No. 3, pp. 335-341, Mar. 13, 2014.

(56) References Cited

OTHER PUBLICATIONS

Yu et al., "Solution-combustion synthesis of epsilo-MnO2 for supercapacitors," Materials Letters, vol. 64, pp. 61-64, Oct. 9, 2009.
Zak, A.K. et al., "Synthesis and characterization of a narrow size distribution of zinc oxide nanoparticles." International Journal of Nanomedicine, 2011, 6, 1399-1403.
International Search Report and Written Opinion, dated Oct. 2, 2019 for related PCT/US2019/038190, filed on Jun. 20, 2019.
Chiu, H.-T. et al., "Intermolecular Interactions and Aggregated Structures in Poly(p-phenylene sulfide) Doped with Some Organic Acceptors," Kobunshi Ronbunshu, vol. 41, No. 9, pp. 525-529, 1984. English abstract only, p. 529.
Wu, Y., ed., "Lithium Ion Battery Application and Practice," Chapter 11: Solid Electrolyte. Chinese; cited in Third Office Action for CN 2015/80018411.6. Art is summarized in the attached foreign Office Action citing the art, and a translation of the summary with a copy of the translator signature is attached.
Fedelich, N., Application Handbook Thermal Analysis of Polymers Selected Applications Thermal Analysis. Retrieved from the Internet: https://www.mt.com/dam/LabDiv/guides-glen/ta-polymer/TA_Polymers_Selected_Apps_EN.pdf.
Imrie, C.T. et al., "Ion Transport in Glassy Polymer Electrolytes," Journal of Physical Chemistry B, vol. 103, pp. 1132-4138, 1999.
Lu, Y. et al., "Platinum-Gold Nanoparticles: A Highly Active Bifunctional Electrocatalyst for Rechargeable Lithium-Air Batteries," Journal of the American Chemical Society vol. 132, No. 35, pp. 12170-12171, 2010.
Taib, N. U. et al., "Plastic crystal-solid biopolymer electrolytes for rechargeable lithium batteries," Journal of Membrane Science, vol. 468, pp. 149-154, 2014.
Hayashi, A. et al., "Superionic glass-ceramic electrolytes for room-temperature rechargeable sodium batteries," Nature Communications, 3:856 (May 22, 2012) 1-5.
International Application No. PCT/US2019/063562 International Search Report dated Mar. 25, 2020.
Moharram, M.A. et al., "Electrical Conductivity of Poly(acrylic acid)—Polyacrylamide Complexes," Journal of Applied Polymer Science, vol. 68, pp. 2049-2055, John Wiley & Sons, Inc. (1998).
Wu, G.M. et al., "Alkaline Zn-air and Al-air cells based on novel solid PVA/PAA polymer electrolyte membranes," Journal of Membrane Science, 280, pp. 802-808, Elsevier B.V. (2006; published online Apr. 4, 2006).
Zhang, Z. et al., "All-solid-state Al-air batteries with polymer alkaline gel electrolyte," Journal of Power Sources., 251, pp. 470-475, Elsevier B.V (2014; available online Nov. 20, 2013).
Yi-Chun Lu, et al., "Platinum-Gold Nanoparticles: A Highly Active Bifunctional Electrocatalyst for Rechargeable Lithium-Air Batteries," Journal of the American Chemical Society, vol. 132, No. 35, Sep. 8, 2010, XP055313090, ISSN: 0002-7863, DOI: 10.1021/ja 1036572.
Yi-Chun Lu, et al. "Catalytic Activity Trends of Oxygen Reduction Reaction for Nonaqueous Li-Air Batteries Supporting Information," Nov. 1, 2011, XP055630428, URL: https://pubs.acs.org/doi/suppl/10.1021/ja 208608s/suppl_file/ja 208608S-si_001.pdf.
Ye et al., Dictionary of Weapon Industry Science and Technology Exploder, edited by Ye Ying, National Defense Industry Press, published in Dec. 1991, p. 13-134.
Liu et al., "Effect of Preparation Methods on Crystallization Behavior and Tensile Strength of Poly(vinylidene fluoride) Membranes," Membranes, 2013, 3, 389-405.
Japanese Office Action dated Dec. 1, 2021, Japanese Application No. 2018-562254 (3 pages).

\* cited by examiner

BATTERY WITH POLYVALENT METAL ANODE

STATEMENT REGARDING FEDERALLY SPONSORED RESEARCH OR DEVELOPMENT (Not Applicable)

FIELD OF THE INVENTION

The apparatus described generally relates to an electrochemical system including a electrochemically active polyvalent metal electrode and a solid ionically conductive polymer material which ionically conducts the polyvalent metal.

BACKGROUND OF THE INVENTION

Polyvalent ions are desirable in electrochemical systems as they can contribute to higher energy densities. As the capacity of a cell is a function of the electrochemically active anode and cathode materials, the number of electrons involved in electrochemical stoichiometric reactions is directly related to the capacity of a battery or other electrochemical system.

Development of new electrochemical cell chemistries is a critical component in meeting the ever increasing demand for renewable power sources. The Department of Energy's Office of Basic Energy Sciences report (DOE-BES 2007) lists the possibility of radical increases in charge density by using multi-electron redox couples such as alkaline earths (e.g. Al, $Mg^{2+}$). Referring to Table 1, there is shown some calculated theoretical properties of different battery chemistries from this report.

TABLE 1

| Chemistry (Anode-cathode) | Potential (V) | Energy density | | Anode cost ($/kg) | Cathode cost ($/kg) |
|---|---|---|---|---|---|
| | | (W h $kg^{-1}$) | (W h $L^{-1}$) | | |
| Mg—S | 1.77 | 1684 | 3221 | 3.1 | 0.29 |
| Li—S | 2.28 | 2654 | 2856 | 69.2 | 0.29 |
| $C_6$—$LiCoO_2$ | 3.60 (avg.) | 568 | 1901 | 20-40 | 45 |

Magnesium batteries are an example of a polyvalent metal that possesses a high energy density using abundant, low cost materials. With magnesium and other polyvalent metal anodes, two classes of cathodes can be used. The first class is a intercalation cathode such as a layered transition metal oxide/sulfide (e.g. Chevrel phase). The second, uses conversion cathodes like sulfur or other materials which electrochemically react with the polyvalent metal. Sulfur is particularly attractive because it is abundant, cheap, and offers theoretical energy densities twice that of current graphite/lithium cobalt oxide batteries (See Table 1). However, a key issue for magnesium and other polyvalent metal batteries has been electrolyte compatibility.

Use of sulfur cathodes add additional compatibility issues associated with the formation of reaction intermediates known as polysulfides that migrate throughout the cell.

Systems using an electrolyte that can address these compatibility issues have been few. Mg/S batteries using a complicated liquid-electrolyte formulation that also demonstrated poor coulombic efficiency and significant capacity loss within the first two cycles.

The present embodiments overcome the above problems as well as provide additional advantages.

SUMMARY OF THE INVENTION

According to one aspect of the invention, a battery is provided having an electrode comprising a solid ionically conductive polymer material and a polyvalent metal, wherein ions of the polyvalent metal are conducted by said solid ionically conductive polymer and reversibly transported into and out of the battery electrode.

According to another aspect of the invention, the battery includes: a first battery electrode, comprising a solid ionically conductive polymer and a polyvalent metal, wherein ions of the polyvalent metal are conducted by said solid ionically conductive polymer and reversibly transported into and out of said first battery electrode; a second battery electrode, wherein said ions are reversibly transported into and out of said second battery electrode; and a dielectric, ionically conductive, non-electrochemically active electrolyte layer positioned between the first and second battery electrode wherein the electrolyte layer allows for the transport of ions between the first and second battery electrodes.

According to further aspects, the battery may include one or more of the following:

The battery wherein the polyvalent metal is dispersed in said solid ionically conductive polymer material, wherein the polyvalent metal is encapsulated by said solid ionically conductive polymer material, or wherein the polyvalent metal is granulated, and the particles are encapsulated by said solid ionically conductive polymer material.

The battery wherein the polyvalent metal particles are each less than 100 microns.

The battery, wherein the battery electrode is extruded.

The battery, further comprising an electrically conductive material.

The battery wherein said second battery electrode comprises the solid ionically conductive polymer material and an intercalation compound.

The battery, wherein said second battery electrode comprises said solid ionically conductive polymer and an electrochemically active compound which reacts with said polyvalent ion when the polyvalent ion enters the second battery electrode.

The battery, wherein said electrochemically active compound is sulfur.

The battery, wherein said electrochemically active compound is manganese dioxide.

The battery, wherein said electrolyte layer comprises said solid ionically conductive polymer.

The battery, wherein the electrolyte layer is extruded.

The battery, wherein the electrolyte layer is thermoformed.

The battery, wherein the first battery electrode is thermoformed.

The battery, wherein the polyvalent metal is aluminum, magnesium or calcium.

The battery, wherein said polyvalent metal is selected from a group comprising aluminum, calcium, magnesium, zinc, iron, scandium, chromium, copper and combinations thereof.

The battery, wherein the electrolyte layer comprises the solid ionically conductive polymer material, and wherein said second battery electrode comprises said solid ionically conductive polymer material and an electrochemically active compound which reacts with said polyvalent ion when said polyvalent ion enters said second battery electrode.

The battery, wherein the solid, ionically conductive, polymer material comprises: a crystallinity greater than 30%; a melting temperature; a glassy state; and both at least one cationic and anionic diffusing ion, wherein at least one diffusing ion is mobile in the glassy state.

The battery, wherein the material further comprising a plurality of charge transfer complexes.

The battery, wherein the material comprises a plurality of monomers, and wherein each charge transfer complex is positioned on a monomer.

The battery, wherein the electronic conductivity of the solid ionically conducting polymer material is less than $1 \times 10^{-8}$ S/cm at room temperature at room temperature.

The battery, wherein the solid ionically conductive polymer material is semicrystalline, and comprises: A plurality of monomers; A plurality of charge transfer complexes, wherein each charge transfer complex is positioned on a monomer; and wherein the electronic conductivity of the solid ionically conducting polymer material is less than $1 \times 10^{-8}$ S/cm at room temperature at room temperature.

The battery, wherein the crystallinity of the material is greater than 30%;

The battery, wherein the material further comprises both a cationic and anionic diffusing ion, whereby each diffusing ion is mobile in the glassy state, and wherein the crystallinity of the material is greater than 30%.

The battery, wherein the charge transfer complex is formed by the reaction of a polymer and an electron acceptor.

The battery, wherein the material has a glassy state, and at least one cationic and at least one anionic diffusing ion, wherein each diffusing ion is mobile in the glassy state.

The battery, wherein the melting temperature of the material is greater than 250° C.

The battery, wherein the ionic conductivity of the material is greater than $1.0 \times 10^{-5}$ S/cm at room temperature.

The battery, wherein the material comprises a single cationic diffusing ion, wherein the diffusivity of the cationic diffusing ion is greater than $1.0 \times 10^{-12}$ m²/s at room temperature.

The battery, wherein the material comprises a single anionic diffusing ion, wherein the diffusivity of the anionic diffusing ion is greater than $1.0 \times 10^{-12}$ m²/s at room temperature.

The battery, wherein the solid ionically conductive polymer material comprises a plurality of monomers, and wherein there is at least one anionic diffusing ion per monomer.

The battery, wherein the solid ionically conductive polymer material comprises a plurality of monomers, and wherein there is at least one cationic diffusing ion per monomer.

The battery, wherein there is at least one mole of the cationic diffusing ion per liter material.

The battery, wherein the charge transfer complex is formed by the reaction of a polymer, electron acceptor, and an ionic compound, wherein each cationic and anionic diffusing ion is a reaction product of the ionic compound.

The battery, wherein the material is formed from at least one ionic compound, wherein the ionic compound comprises the polyvalent metal.

The battery, wherein the material is a thermoplastic.

The battery, wherein one of the at least cationic diffusing ion, has a diffusivity greater than $1.0 \times 10^{-12}$ m²/s.

The battery, wherein one of the at least one anionic diffusing ion has a diffusivity greater than $1.0 \times 10^{-12}$ m²/s.

The battery, wherein one of both the at least one anionic diffusing ion and at least one cationic diffusing ion has a diffusivity greater than $1.0 \times 10^{-12}$ m²/s.

The battery, wherein the solid ionically conductive polymer material comprises a plurality of monomers, and wherein each monomer comprises an aromatic or heterocyclic ring structure positioned in the backbone of the monomer.

The battery, wherein the material further includes a heteroatom incorporated in the ring structure or positioned on the backbone adjacent the ring structure.

The battery, wherein the heteroatom is selected from the group consisting of sulfur, oxygen or nitrogen.

The battery, wherein the heteroatom is positioned on the backbone of the monomer adjacent the ring structure.

The battery, wherein the heteroatom is sulfur.

The battery, wherein the material is pi-conjugated.

The battery, wherein the polymer comprises a plurality of monomers, wherein the molecular weight of the monomer is greater than 100 grams/mole.

The battery, wherein the ionic conductivity of the material is isotropic.

The battery, having an ionic conductivity greater than $1 \times 10^{-4}$ S/cm at room temperature.

The battery, having an ionic conductivity greater than $1 \times 10^{-3}$ S/cm at 80° C.

The battery, having an ionic conductivity greater than $1 \times 10^{-5}$ S/cm at −40° C.

The battery, wherein the material in non-flammable.

The battery, wherein the Young's modulus of the material is equal to or greater than 3.0 MPa.

The battery, wherein the material is the reaction product of a base polymer, an electron acceptor and an ionic compound.

The battery, wherein the base polymer is a liquid crystal polymer, an undoped conjugated polymer or PPS.

The battery, wherein the ionic compound comprises the polyvalent metal.

The battery, wherein the electron acceptor is a quinone.

DETAILED DESCRIPTION OF THE PREFERRED EMBODIMENTS

This application claims the benefit of U.S. Provisional Patent Application No. 62/172,467 filed Jun. 8, 2015 incorporated herein by reference; and also incorporates by reference U.S. Provisional Patent Application No. 62/158,841 filed May 8, 2015; U.S. patent application Ser. No. 14/559, 430 filed Dec. 3, 2014; U.S. Provisional Patent Application No. 61/911,049 filed Dec. 3, 2013; U.S. patent application Ser. No. 13/861,170 filed Apr. 11, 2013; and U.S. Provisional Patent Application No. 61/622,705 filed Apr. 11, 2012.

The described aspects relate to an electrochemical system including a electrochemically active polyvalent metal electrode and a solid ionically conductive polymer material which ionically conducts the polyvalent metal. This combination of the polyvalent metal and the solid ionically conductive polymer material can be applied in a battery such as in a battery electrode.

The following explanations of terms are provided to better detail the descriptions of aspects, embodiments and objects that will be set forth in this section. Unless explained or defined otherwise, all technical and scientific terms used herein have the same meaning as commonly understood to one of ordinary skill in the art to which this disclosure belongs. In order to facilitate review of the various embodiments of the disclosure, the following explanations of specific terms are provided:

A depolarizer is a synonym of electrochemically active substance, i.e., a substance which changes its oxidation state, or partakes in a formation or breaking of chemical bonds, in a charge-transfer step of an electrochemical reaction and electrochemically active material. When an electrode has more than one electroactive substances they can be referred to as codepolarizers.

Thermoplastic is a characteristic of a plastic material or polymer to become pliable or moldable above a specific temperature often around or at its melting temperature and to solidify upon cooling.

Solid electrolytes include solvent free polymers, and ceramic compounds (crystalline and glasses).

A "Solid" is characterized by the ability to keep its shape over an indefinitely long period, and is distinguished and different from a material in a liquid phase. The atomic structure of solids can be either crystalline or amorphous. Solids can be mixed with or be components in composite structures. However, for purposes of this application and its claims, a solid material requires that that material be ionically conductive through the solid and not through any solvent, gel or liquid phase, unless it is otherwise described. For purposes of this application and its claims, gelled (or wet) polymers and other materials dependent on liquids for ionic conductivity are defined as not being solid electrolytes in that they rely on a liquid phase for their ionic conductivity.

A polymer is typically organic and comprised of carbon based macromolecules, each of which have one or more type of repeating units or monomers. Polymers are light-weight, ductile, usually non-conductive and melt at relatively low temperatures. Polymers can be made into products by injection, blow and other molding processes, extrusion, pressing, stamping, three dimensional printing, machining and other plastic processes. Polymers typically have a glassy state at temperatures below the glass transition temperature Tg. This glass temperature is a function of chain flexibility, and occurs when there is enough vibrational (thermal) energy in the system to create sufficient free-volume to permit sequences of segments of the polymer macromolecule to move together as a unit. However, in the glassy state of a polymer, there is no segmental motion of the polymer.

Polymers are distinguished from ceramics which are defined as inorganic, non-metallic materials; typically compounds consisting of metals covalently bonded to oxygen, nitrogen or carbon, brittle, strong and non-conducting.

The glass transition, which occurs in some polymers, is a midpoint temperature between the supercooled liquid state and a glassy state as a polymer material is cooled. The thermodynamic measurements of the glass transition are done by measuring a physical property of the polymer, e.g. volume, enthalpy or entropy and other derivative properties as a function of temperature. The glass transition temperature is observed on such a plot as a break in the selected property (volume of enthalpy) or from a change in slope (heat capacity or thermal expansion coefficient) at the transition temperature. Upon cooling a polymer from above the Tg to below the Tg, the polymer molecular mobility slows down until the polymer reaches its glassy state.

As a polymer can comprise both amorphous and crystalline phase, polymer crystallinity is the amount of this crystalline phase relative the amount of the polymer and is represented as a percentage. Crystallinity percentage can be calculated via x-ray diffraction of the polymer by analysis of the relative areas of the amorphous and crystalline phases.

A polymer film is generally described as a thin portion of polymer, but should be understood as equal to or less than 300 micrometers thick.

It is important to note that the ionic conductivity is different from electrical conductivity. Ionic conductivity depends on ionic diffusivity, and the properties are related by the Nernst-Einstein equation. Ionic conductivity and ionic diffusivity are both measures of ionic mobility. An ionic is mobile in a material if its diffusivity in the material is positive (greater than zero), or it contributes to a positive conductivity. All such ionic mobility measurements are taken at room temperature (around 21° C.), unless otherwise stated. As ionic mobility is affected by temperature, it can be difficult to detect at low temperatures. Equipment detection limits can be a factor in determining small mobility amounts. Mobility can be understood as diffusivity of an ion at least $1\times10^{-14}$ m$^2$/s and preferably at least $1\times10^{-13}$ m$^2$/s, which both communicate an ion is mobile in a material.

A solid polymer ionically conducting material is a solid that comprises a polymer and that conducts ions as will be further described.

An aspect of the present invention includes a method of synthesizing a solid ionically conductive polymer material from at least three distinct components: a polymer, a dopant and an ionic compound. The components and method of synthesis are chosen for the particular application of the material. The selection of the polymer, dopant and ionic compound may also vary based on the desired performance of the material. For example, the desired components and method of synthesis may be determined by optimization of a desired physical characteristic (e.g. ionic conductivity).

Synthesis:

The method of synthesis can also vary depending on the particular components and the desired form of the end material (e.g. film, particulate, etc.). However, the method includes the basic steps of mixing at least two of the components initially, adding the third component in an optional second mixing step, and heating the components/reactants to synthesis the solid ionically conducting polymer material in a heating step. In one aspect of the invention, the resulting mixture can be optionally formed into a film of desired size. If the dopant was not present in the mixture produced in the first step, then it can be subsequently added to the mixture while heat and optionally pressure (positive pressure or vacuum) are applied. All three components can be present and mixed and heated to complete the synthesis of the solid ionically conducting polymer material in a single step. However, this heating step can be done when in a separate step from any mixing or can completed while mixing is being done. The heating step can be performed regardless of the form of the mixture (e.g. film, particulate, etc.) In an aspect of the synthesis method, all three components are mixed and then extruded into a film. The film is heated to complete the synthesis.

When the solid ionically conducting polymer material is synthesized, a color change occurs which can be visually observed as the reactants color is a relatively light color, and the solid ionically conducting polymer material is a relatively dark or black color. It is believed that this color change occurs as charge transfer complexes are being formed, and can occur gradually or quickly depending on the synthesis method.

An aspect of the method of synthesis is mixing the base polymer, ionic compound and dopant together and heating the mixture in a second step. As the dopant can be in the gas phase, the heating step can be performed in the presence of the dopant. The mixing step can be performed in an extruder, blender, mill or other equipment typical of plastic processing. The heating step can last several hours (e.g. twenty-four (24) hours) and the color change is a reliable indication that synthesis is complete or partially complete. Additional heating past synthesis does not appear to negatively affect the material.

In an aspect of the synthesis method, the base polymer and ionic compound can be first mixed. The dopant is then mixed with the polymer-ionic compound mixture and heated. The heating can be applied to the mixture during the second mixture step or subsequent to the mixing step.

In another aspect of the synthesis method, the base polymer and the dopant are first mixed, and then heated. This heating step can be applied after the mixing or during, and produces a color change indicating the formation of the charge transfer complexes and the reaction between the dopant and the base polymer. The ionic compound is then mixed to the reacted polymer dopant material to complete the formation of the solid ionically conducting polymer material.

Typical methods of adding the dopant are known to those skilled in the art and can include vapor doping of a film containing the polymer and ionic compound and other doping methods known to those skilled in the art. Upon doping the solid polymer material becomes ionically conductive, and it is believed that the doping acts to activate the ionic components of the solid polymer material so they are diffusing ions.

Other non-reactive components can be added to the above described mixtures during the initial mixing steps, secondary mixing steps or mixing steps subsequent to heating. Such other components include but are not limited to depolarizers or electrochemically active materials such as anode or cathode active materials, electrically conductive materials such as carbons, rheological agents such as binders or extrusion aids (e.g. ethylene propylene diene monomer "EPDM"), catalysts and other components useful to achieve the desired physical properties of the mixture.

Polymers that are useful as reactants in the synthesis of the solid ionically conductive polymer material are electron donors or polymers which can be oxidized by electron acceptors. Semi-crystalline polymers with a crystallinity index greater than 30%, and greater than 50% are suitable reactant polymers. Totally crystalline polymer materials such as liquid crystal polymers ("LCPs") are also useful as reactant polymers. LCPs are totally crystalline and therefore their crystallinity index is hereby defined as 100%. Undoped conjugated polymers and polymers such as polyphenylene sulfide ("PPS") are also suitable polymer reactants.

Polymers are typically not electrically conductive. For example, virgin PPS has electrical conductivity of $10^{-20}$ S $cm^{-1}$. Non-electrically conductive polymers are suitable reactant polymers.

In an aspect, polymers useful as reactants can possess an aromatic or heterocyclic component in the backbone of each repeating monomer group, and a heteroatom either incorporated in the heterocyclic ring or positioned along the backbone in a position adjacent the aromatic ring. The heteroatom can be located directly on the backbone or bonded to a carbon atom which is positioned directly on the backbone. In both cases where the heteroatom is located on the backbone or bonded to a carbon atom positioned on the backbone, the backbone atom is positioned on the backbone adjacent to an aromatic ring. Non-limiting examples of the polymers used in this aspect of the invention can be selected from the group including PPS, Poly(p-phenylene oxide) ("PPO"), LCPs, Polyether ether ketone ("PEEK"), Polyphthalamide ("PPA"), Polypyrrole, Polyaniline, and Polysulfone. Co-polymers including monomers of the listed polymers and mixtures of these polymers may also be used. For example, copolymers of p-hydroxybenzoic acid can be appropriate liquid crystal polymer base polymers. Table 2 details non-limiting examples of reactant polymers useful in the present invention along with monomer structure and some physical property information which should be considered also non-limiting as polymers can take multiple forms which can affect their physical properties.

TABLE 2

| Polymer | Monomer Structure | Melting Pt. (C.) | MW |
|---|---|---|---|
| PPS polyphenylene sulfide |  | 285 | 109 |
| PPO Poly(p-phenylene oxide) |  | 262 | 92 |
| PEEK Polyether ether ketone |  | 335 | 288 |

TABLE 2-continued

| Polymer | Monomer Structure | Melting Pt. (C.) | MW |
|---|---|---|---|
| PPA Polyphthalamide | | 312 | |
| Polypyrrole | | | |
| Polyaniline Poly-Phenylamine [$C_6H_4NH$]$_n$ | | 385 | 442 |
| Polysulfone | | | 240 |
| Xydar (LCP) | | | |
| Vectran Polyparaphenylene terephthalamide [—CO—$C_6H_4$—CO—NH—$C_6H_4$—NH—]$_n$ | | | |
| Polyvinylidene fluoride (PVDF) | | 177° C. | |
| Polyacrylonitrile (PAN) | | 300° C. | |
| Polytetrafluoroethylene (PTFE) | | 327 | |
| Polyethylene (PE) | | 115-135 | |

Dopants that are useful as reactants in the synthesis of the solid ionically conductive polymer material are electron acceptors or oxidants. It is believed that the dopant acts to release ions for ionic transport and mobility, and it is believed to create a site analogous to a charge transfer complex or site within the polymer to allow for ionic conductivity. Non-limiting examples of useful dopants are quinones such as: 2,3-dicyano-5,6-dichlorodicyanoquinone ($C_8Cl_2N_2O_2$) also known as "DDQ", and tetrachloro-1,4-benzoquinone ($C_6Cl_4O_2$), also known as chloranil, tetracyanoethylene ($C_6N_4$) also known as TCNE, sulfur trioxide ("$SO_3$"), ozone (trioxygen or $O_3$), oxygen ($O_2$, including air), transition metal oxides including manganese dioxide ("$MnO_2$"), or any suitable electron acceptor, etc. and combinations thereof. Dopants are those that are temperature stable at the temperatures of the synthesis heating step are useful, and quinones and other dopants which are both temperature stable and strong oxidizers quinones are most useful. Table 3 provides a non-limiting listing of dopants, along with their chemical diagrams.

preferred. The particular ionic compound included in the synthesis depends on the utility desired for the material.

For example, in an application where it would be desired to have a polyvalent high energy density system, a polyvalent cation, a polyvalent hydroxide, polyvalent chloride or a lithium oxide convertible to a polyvalent ion would be appropriate. As would be any polyvalent ion containing compound that releases both a polyvalent cathode and a diffusing anion during synthesis. As will be further demonstrated, ionic compounds including alkaline metals, alkaline

TABLE 3

| Dopant | Formula | Structure |
|---|---|---|
| 2,3-Dichloro-5,6-dicyano-1,4-benzoquinone (DDQ) | $C_6Cl_2(CN)_2O_2$ | |
| tetrachloro-1,4-benzoquinone (chloranil) | $C_6Cl_4O_2$ | |
| Tetracyanoethylene (TCNE) | $C_6N_4$ | |
| Sulfur Trioxide | $SO_3$ | |
| Ozone | $O_3$ | |
| Oxygen | $O_2$ | |
| Metal Oxides | $M_xO_y$ (M = Metal, x and y greater or equal to 1) | |

Ionic compounds that are useful as reactants in the synthesis of the solid ionically conductive polymer material are compounds that release desired ions during the synthesis of the solid ionically conductive polymer material. The ionic compound is distinct from the dopant in that both an ionic compound and a dopant are required. Non-limiting examples include $Li_2O$, LiOH, ZnO, $TiO_2$, $Al_3O_2$, NaOH, KOH, $LiNO_3$, $Na_2O$, MgO, $CaCl_2$, $MgCl_2$, $AlCl_3$, LiTFSI (lithium bis-trifluoromethanesulfonimide), LiFSI (Lithium bis(fluorosulfonyl)imide), Lithium bis(oxalato)borate (LiB$(C_2O_4)_2$ "LiBOB") and other lithium salts and combinations thereof. In an aspect, the ionic compound contains polyvalent metal and are used to produce a solid ionically conductive polymer material that contains a diffusing polyvalent metal ion. Hydrated forms (e.g. monohydride) of these compounds can be used to simplify handling of the compounds. Inorganic oxides, chlorides and hydroxide are suitable ionic compounds in that they dissociate during synthesis to create at least one anionic and cationic diffusing ion. Any such ionic compound that dissociates to create at least one anionic and cationic diffusing ion would similarly be suitable. Multiple ionic compounds can also be useful that result in multiple anionic and cationic diffusing ions can be earth metals, transition metals, and post transition metals in a form that can produce both the desired cationic and anionic diffusing species are appropriate as synthesis reactant ionic compounds.

The solid ionically conductive polymer material can be used in any system requiring ionic mobility of a polyvalent ion. In an aspect, the described solid ionically conductive polymer material can be used in both electrodes as well as an electrolyte interposed between the electrodes. The composition of the solid ionically conductive polymer material can be the same in all three applications and in a battery system all three application share the need for enabling specific ionic mobility for certain ions, e.g. polyvalent cations. However, in the electrodes the solid ionically conductive polymer material can be modified to be electrically conductive by addition of conductive additives such as graphite or other carbons. The solid ionically conductive polymer material composition may also be optimized for a particular physical property while keeping its ionic conductivity adequate for the battery systems. Use of certain base polymers can modify the solid ionically conductive polymer material Young's modulus, and the use of rheological modifiers to assist in extrusion of the solid ionically conductive polymer material. The form of the solid ionically conductive polymer material can be altered and it can be formed into a film or particulate as may be required for different applications. Therefore, in an aspect, uses of the solid ionically conductive polymer material need not be the same solid ionically conductive polymer material in each application within the same battery system.

The anode of the polyvalent battery system includes the polyvalent cathode material. In an aspect the polyvalent material, it is a powder or granulate form and is dispersed in the solid ionically conductive polymer material. As it is dispersed, the polyvalent granulates are encapsulated by the solid ionically conductive polymer material. In an aspect where the solid ionically conductive polymer material is not electrically conductive or to increase electrical conductivity, additional conductive additives can be mixed with the other anode components to enable the anode to be electrically conductive to enable electrons to flow from the polyvalent to an anode current collector in electrical communication with the anode. Such additives are typical of batteries and generally comprise high surface area carbons including graphite. The anode thus acts to ionically conduct polyvalent metal ions.

In an aspect the cathode can be of a construction similar to the anode. The intercalation material or conversion material can be dispersed with the solid ionically conductive polymer material along with an optional electrically conductive additive. The electrochemically active cathode material is mixed with, dispersed within and encapsulated by the solid ionically conductive polymer material. In an aspect, the solid ionically conductive polymer material is ionically conductive for only the diffusing ions incorporated in its synthesis. Therefore, for example, a sulfur or sulfur containing material such as a polysulfide, would not be conductive and therefore would be maintained within the cathode thus reducing a pathway for battery cyclic inefficiency.

The solid ionically conductive polymer material can also act as the electrolyte of the battery. In this use as a solid polymer electrolyte, it is not electrically conductive and instead acts as a dielectric between the anode and cathode electrodes. The solid ionically conductive polymer material can be extruded into a thin film (100-10 micrometers) and remains a thermoplastic in this shape. Therefore, it can be attached thermally to either or both electrodes to save in manufacturing expense and to ensure a good ionic conduction pathway. In an aspect the three components can be coextruded to form a single three component film battery that can efficiently ionically conduct the polyvalent ions between the anode and cathode electrodes during cycling.

The purity of the materials is potentially important so as to prevent any unintended side reactions and to maximize the effectiveness of the synthesis reaction to produce a highly conductive material. Substantially pure reactants with generally high purities of the dopant, base polymer and the ionic compound are preferred, and purities greater than 98% are more preferred with even higher purities, e.g. LiOH: 99.6%, DDQ: >98%, and Chloranil: >99% most preferred.

To further describe the utility of the solid ionically conductive polymer material and the versatility of the above described method of the synthesis of the solid ionically conductive polymer material of the present invention, several classes of the solid ionically conductive polymer material useful for multiple electrochemical applications and distinguished by their application are described:

Example 1

Solid ionically conductive polymer material samples were made by mixing LCP polymer, SRT900 Zydar from Saint Gobain, and an ionic compound in proportions listed in Table 4. DDQ was used a dopant. The molar ratio of polymer monomer to dopant was 4.2:1. A three component mixture was created by thorough mixing of the base polymer, dopant and ionic compound. The mixtures were then heated to about 350° C. for about 30 minutes under moderate pressure (500-1000 psi). After heating a color change is observed which communicates the synthesis of the solid ionically conductive polymer material.

Samples were sandwiched between stainless steel electrodes and placed in test fixture. AC impedance was recorded in the range from 800 KHz to 100 Hz using Bio-Logic VSP test system to determine the ionic conductivity of each solid ionically conductive polymer material sample.

Measured ionic conductivity results are shown in Table 4. The observed ionic conductivity demonstrates that the solid ionically conductive polymer material can conduct multiple ions, including the polyvalent calcium $Ca^{2+}$, magnesium $Mg^{2+}$, and aluminum $Al^{3+}$ ions.

TABLE 4

| Ion Source | Ion Source Wt. % | Conductivity (S/cm) |
| --- | --- | --- |
| $Li_2O$ | 33% | 1.9E-04 |
| $Na_2O$ | 33% | 4.2E-05 |
| MgO | 33% | 6.3E-07 |
| $CaCl_2$ | 33% | 6.2E-03 |
| $MgCl_2$ | 20% | 8.0E-03 |
| $AlCl_3$ | 15% | 2.4E-03 |
| NaOH | 50% | 1.3E-04 |
| KOH | 50% | 2.2E-04 |

The power sources with metal anodes are enabled by being encapsulated or otherwise maintained in an active state by the solid ionically conductive polymer material all more stable and less costly than lithium.

Sodium- and potassium-based energy storage systems are viewed as alternative to Li-ion, driven primarily by low cost and relative abundance of the raw materials. Calcium, magnesium and aluminum ionic conductivity is necessary for polyvalentvalent intercalation systems, capable of increasing energy density beyond capabilities of Li-ion batteries.

It was thus demonstrated that Ionic's polymer electrolyte can be engineered to conduct polyvalent ions, including $Mg^{2+}$ (8 mS $cm^{-1}$ at 20° C.). This polymer electrolyte is thus ideally suited for rechargeable magnesium-sulfur (Mg/S) batteries.

The present application and this detailed description hereby incorporates the following applications entire specification, including claims, abstract and drawings: Provisional U.S. Patent Application Ser. No. 62/158,841 filed on May 8, 2015; U.S. patent application Ser. No. 14/559,430 filed on Dec. 3, 2014; Provisional U.S. Patent Application Ser. No. 61/911,049 filed on Dec. 3, 2013; Ser. No. 13/861,170, filed on Apr. 11, 2013; and Provisional U.S. Patent Application Ser. No. 61/622,705 filed on Apr. 11, 2012.

Figure 1:
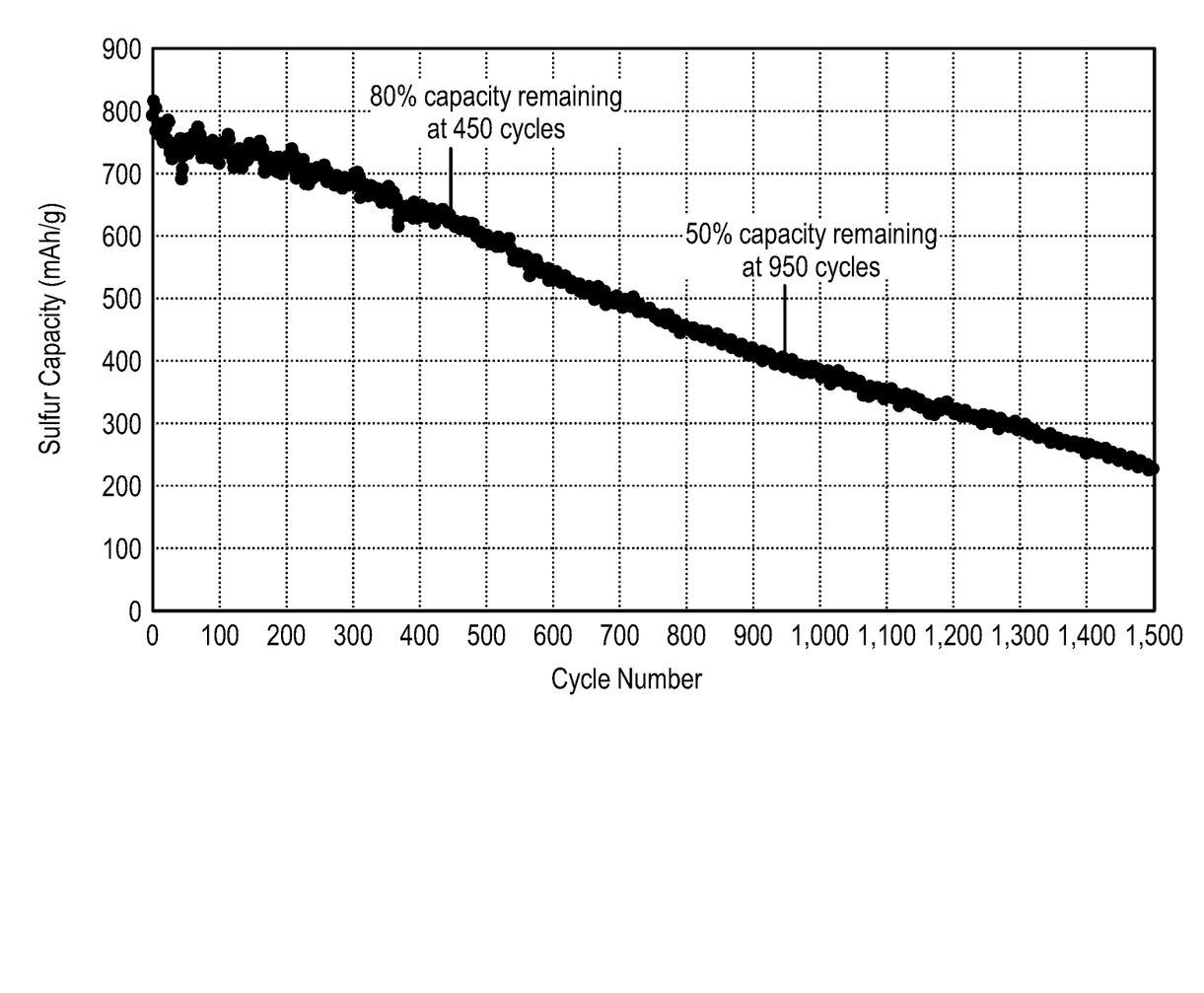
FIG. 1 is a performance plot of a cycle test of a cell using a sulfur cathode containing the solid, ionically conductive, polymer material.

In related applications, incorporated by reference, a demonstrated improved performance sulfur cathode incorporating the solid ionically conductive polymer material in a battery has been shown. Referring to FIG. 1 there is shown a capacity v. cycle for a battery including such a sulfur cathode. In an aspect the use of polyvalent cations in cooperation with such a Sulfur cathode provides a useful polyvalent cation battery using the solid ionically conductive polymer material. In an aspect the polyvalent cations can be coupled with an appropriate alternative intercalation material or a conversion cathode.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A battery having a first electrode comprising:
a solid ionically conductive polymer material; and
a polyvalent metal;
wherein a plurality of ions of the polyvalent metal are ionically conducted by said solid ionically conductive polymer material;
wherein the plurality of ions of the polyvalent metal can be reversibly transported into and or out of the first electrode; and
wherein the solid ionically conductive polymer material is ionically conductive through the solid and not through any solvent, gel or liquid phase;
wherein the solid ionically conductive material is a reaction product of a base polymer, an electron acceptor and an ionic compound;
wherein an ionic conductivity of the solid ionically conductive material is greater than $1.0 \times 10^{-5}$ S/cm at room temperature; and
wherein the material has a glassy state and at least one cationic and at least one anionic diffusing ion, wherein each diffusing ion is mobile in the glassy state.

2. The battery of claim 1, wherein the polyvalent metal is dispersed in said solid ionically conductive polymer material.

3. The battery of claim 1, wherein the polyvalent metal is encapsulated by said solid ionically conductive polymer material.

4. The battery of claim 1,
wherein the polyvalent metal is granulated including a plurality of polyvalent metal particles; and
the plurality of polyvalent metal particles are mixed with the solid ionically conductive polymer material.

5. The battery of claim 4, wherein the plurality of polyvalent metal particles are each less than 100 microns in diameter.

6. The battery of claim 1, wherein the first electrode is extruded.

7. The battery of claim 1, further comprising an electrically conductive material.

8. The battery of claim 1, further comprising a second electrode which comprises an electrochemically active compound which reacts with the plurality of ions of the polyvalent metal.

9. The battery of claim 8, wherein said electrochemically active compound is sulfur.

10. The battery of claim 8, wherein said electrochemically active compound is manganese dioxide.

11. The battery of claim 8, wherein said second electrode comprises said solid ionically conductive polymer material.

12. The battery of claim 8, wherein the first electrode is thermoformed.

13. The battery of claim 8, wherein said polyvalent metal is selected from a group consisting of aluminum, calcium, magnesium, zinc, iron, scandium, chromium, copper and at least two of the aforementioned.

14. The battery of claim 8 further comprising:
an electrolyte layer interposed between the first electrode and the second electrode;
wherein the electrolyte layer comprises the solid ionically conductive polymer material.

15. The battery of claim 1, wherein the solid ionically conductive, polymer material has a crystallinity of greater than 30%.

16. The battery of claim 1, wherein an electronic conductivity of the solid ionically conductive polymer material is less than $1 \times 10^{-8}$ S/cm at room temperature.

17. The battery of claim 1,
wherein the solid ionically conductive material further comprises both a cationic diffusing ion and an anionic diffusing ion;
wherein each of the cationic diffusing ion and the anionic diffusing ion is mobile at room temperature and
wherein a crystallinity of the solid ionically conductive material is greater than 30%.

18. The battery of claim 1, wherein a melting temperature of the solid ionically conductive material is greater than 250° C.

19. The battery of claim 8, wherein a melting temperature of the solid ionically conductive material is greater than 250° C.

20. The battery of claim 8, wherein an ionic conductivity of the solid ionically conductive material is greater than $1.0 \times 10^{-5}$ S/cm at room temperature.

21. The battery of claim 1,
wherein the solid ionically conductive material comprises a cationic diffusing ion; and
wherein there is at least one mole of the cationic diffusing ion per liter of the solid ionically conductive material.

22. The battery of claim 8,
wherein the solid ionically conductive material comprises a cationic diffusing ion; and
wherein there is at least one mole of the cationic diffusing ion per liter of the solid ionically conductive material.

23. The battery of claim 1,
wherein the solid ionically conductive material is formed from at least one ionic compound; and
wherein the ionic compound comprises the polyvalent metal.

24. The battery of claim 8,
wherein the solid ionically conductive material is formed from at least one ionic compound; and
wherein the ionic compound comprises the polyvalent metal.

25. The battery of claim 1, wherein the solid ionically conductive material is a thermoplastic.

26. The battery of claim 1, wherein an ionic conductivity of the solid ionically conductive material is isotropic.

27. The battery of claim 1, wherein the solid ionically conductive material has an ionic conductivity greater than $1 \times 10^{-4}$ S/cm at room temperature.

28. The battery of claim 1, wherein the solid ionically conductive material has an ionic conductivity greater than $1 \times 10^{-3}$ S/cm at 80° C.

29. The battery of claim 1, wherein the solid ionically conductive material has an ionic conductivity greater than $1 \times 10^{-5}$ S/cm at −40° C.

30. The battery of claim 1, wherein the solid ionically conductive material has a Young's modulus of equal to or greater than 3.0 MPa.

31. The battery of claim 8, wherein the solid ionically conductive material has a Young's modulus of equal to or greater than 3.0 MPa.

32. The battery of claim 1, wherein the base polymer is selected from the group consisting of polyphenylene sulfide (PPS), Poly(p-phenylene oxide) (PPO), liquid crystal polymers (LCPs), Polyether ether ketone (PEEK), Polyphthalamide (PPA), Polypyrrole, Polyaniline, Polysulfone, Polyaniline Poly-Phenylamine [C6H4NH]n, Poly-paraphenylene terephthalmide [—CO—C6H4-CO—NH—C6H4-NH-]n, Polyvinylidene fluoride (PVDF), Polyacrylonitrile (PAN), Polytetrafluoroethylene (PTFE), Polyethylene (PE), a copolymer including monomers of at least two of the aforementioned polymers; and a combination of at least two of the aforementioned polymers.

33. The battery of claim 1, wherein the dopant is selected from the group consisting of 2,3-Dichloro-5,6-dicyano-1,4-benzoquinone (DDQ) ($C_8Cl_2N_2O_2$), tetrachloro-1,4-benzoquinone (chloranil) ($C_6Cl_4O_2$), tetracyanoethylene ($C_6N_4$), sulfur trioxide ($SO_3$), ozone (trioxygen or O3), oxygen ($O_2$), air, a transition metal oxide, $MnO_2$, and a combination of at least two of the aforementioned.

34. The battery of claim 1, wherein the ionic compound is selected from the group consisting of $Li_2O$, LiOH, ZnO, $TiO_2$, Al2O3, NaOH, KOH, $LiNO_3$, $Na_2O$, MgO, $CaCl_2$, $MgCl_2$, $AlCl_3$, LiTFSI (lithium bis-trifluoromethanesulfonimide), LiFSI (Lithium bis(fluorosulfonyl)imide), Lithium bis(oxalato)borate ($LiB(C_2O_4)_2$, LiBOB), and a combination of at least two of the aforementioned.

* * * * *